United States Patent [19]
Yoshimi et al.

[11] Patent Number: 5,603,093
[45] Date of Patent: Feb. 11, 1997

[54] METHOD FOR MONITORING THE STATE OF INTERFERENCE BY A BASE STATION OF A MOBILE RADIO COMMUNICATION SYSTEM

[75] Inventors: Masaaki Yoshimi, Fujisawa; Kiyohito Nagata; Kazuhiko Kakinuma, both of Yokohama; Tatsuaki Wakabayashi, Yokosuka, all of Japan

[73] Assignee: NTT Mobile Communications Network, Inc., Tokyo, Japan

[21] Appl. No.: 571,649

[22] Filed: Dec. 13, 1995

[30] Foreign Application Priority Data

Dec. 28, 1994 [JP] Japan .................................. 6-327795

[51] Int. Cl.$^6$ ................................................ H04B 15/00
[52] U.S. Cl. ........................ 455/63; 455/33.1; 455/54.1; 455/67.3
[58] Field of Search .................................. 455/33.1, 33.2, 455/34.1, 34.2, 50.1, 54.1, 54.2, 56.1, 62, 63, 67.1, 67.3, 69, 70, 226.1, 226.2, 226.3; 379/59, 60

[56] References Cited

U.S. PATENT DOCUMENTS

| | | | |
|---|---|---|---|
| 5,157,709 | 10/1992 | Ohteru | 455/63 |
| 5,179,722 | 1/1993 | Gunmar et al. | 455/67.3 |
| 5,375,123 | 12/1994 | Andersson et al. | 455/33.1 |
| 5,506,869 | 4/1996 | Royer | 455/69 |

FOREIGN PATENT DOCUMENTS

94/05097  3/1994  WIPO ................................. 455/67.3

Primary Examiner—Reinhard J. Eisenzopf
Assistant Examiner—Nguyen Vo
Attorney, Agent, or Firm—Pollock, Vande Sande & Priddy

[57] ABSTRACT

A mobile station measures the field intensity and bit error rate of a downlink radio wave from a base station at each measurement timing and reports the measured results to the base station. Upon receiving the measured results from each mobile station, the base station compares the measured results with a reference characteristic to determine if they are abnormal or not. The base station acquires the determined results of the measured results for a fixed period of time and statistically processes them to judge the state of interference.

5 Claims, 4 Drawing Sheets

METHOD FOR MONITORING THE STATE OF INTERFERENCE BY A BASE STATION OF A MOBILE RADIO COMMUNICATION SYSTEM

BACKGROUND OF THE INVENTION

The present invention relates to a method for monitoring the state of interference of radio waves by each base station in a mobile radio communication system wherein the service area is divided into a plurality of zones and a plurality of radio channels of different frequencies are reused in respective zones over the entire service area with a minimum of co-channel interference. More particularly, the invention is directed to a method for monitoring the state of interference of radio waves by an autonomous base station which monitors the state of interference of radio waves in the radio channel of the same frequency as that of the radio channel of the base station and, when the state of interference goes down below a prescribed value, switches the radio channel to a different one or goes out of service.

In a mobile radio communication system, as shown in FIG. 1, base stations $BS_1, BS_2, \ldots, BS_M$ are each provided in one of a plurality of zones $Z_1, Z_2, \ldots, Z_M$ forming a service area SA and, for example, radio channels of frequencies $f_1, f_2, \ldots, f_6$ are assigned to the zones $Z_1, Z_2, \ldots, Z_M$, respectively, as shown. In this instance, radio channels of the same frequency $f_1$, for example, are assigned to zones distant from each other, such as $Z_1$ and $Z_6$, with particular attention to the suppression of what is called co-channel interference for efficient reuse of a plurality of radio channels of different frequencies over the entire service area to provide for increased utilization factor of frequency.

In the conventional frequency assignment to respective zones, the distance between radio base stations using the same channel frequencies in the individual zones and their transmitting power are determined through theoretical calculation such that radio waves to each of the zones from the others are sufficiently attenuated to make the interference negligibly small.

In this way, the conventional system reuses the frequencies $f_1, f_2, \ldots, f_6$ of the same set with a view to maximizing the utilization factor of radio waves. With such a conventional system, when an unexpected new propagation path appears or an existing propagation path disappears due to a change in the radio wave propagation environment, radio waves of the same frequency from two radio base stations may sometimes interfere with each other. To measure such interference, it is customary in the prior art to radiate radio waves from each of the two radio base stations one at a time, measure their electric field intensities and make a comprehensive analysis of the measured results, thereby judging the range over which the radio waves from each base station exert an influence. Even after the mobile radio communication system is put into service, interference occurs or disappears due to a change in the radio wave propagation environment, for example, when the service area is extended and base stations are set up in new zones, when the frequency allocation scheme is partly or wholly modified, or when a large building or tower is put up or pulled down. Hence, it is necessary, after putting the mobile communication system into service, to check the state of interference with the radio channel of each of the zones using the same frequency; to perform this for each zone, the transmission of radio waves from its base station needs to be stopped. Furthermore, the interference of radio waves is measured using a dedicated measurement device.

To learn the state of interference of radio waves in one of the zones using the same channel frequency, it is general practice in the prior art to measure the field intensity of radio waves that are caused to radiate one by one from other base stations; hence, much time is needed for the measurement and the judgement of the state of interference. In particular, while the system is in service, the field intensities of the radio waves from the other base stations are measured in a region wherein the radio wave from the base station of that one zone is considered to have a sufficiently high reception level, so that the transmission of the radio wave from the base station of that one zone must be stopped; however, since the transmission of a radio wave cannot frequently be stopped while the system is in service, an appreciable amount of time is required to measure the field intensities of radio waves from other base stations. On this account, the measurement cannot be made rapidly following changes in the radio wave propagation environment, and hence gets far behind, sometimes leaving a region of an undesired state of reception in the zone as it is for a considerably long period of time. Moreover, since the measurement is made on the radio wave radiated from only one of a plurality of base stations using the same frequency that are considered to interfere with each other, the mobile radio communication service is impaired during the measurement.

SUMMARY OF THE INVENTION

It is therefore an object of the present invention to provide a method that permits easy, accurate monitoring of the state of co-channel interference even if the mobile radio communication system is in service.

According to the present invention, a mobile station measures the field intensity and quality of a downlink radio wave thereto from a radio base station at regular intervals and reports back thereto the measured results, and the base station statistically processes the reported measured results into data on the radio wave emitted therefrom and makes a comprehensive analysis of such pieces of data, thereby monitoring the interference between the radio wave from the concerned radio base station and radio waves from other base stations using the same frequency as that of the former.

DESCRIPTION OF THE PREFERRED EMBODIMENT

Figure 1:
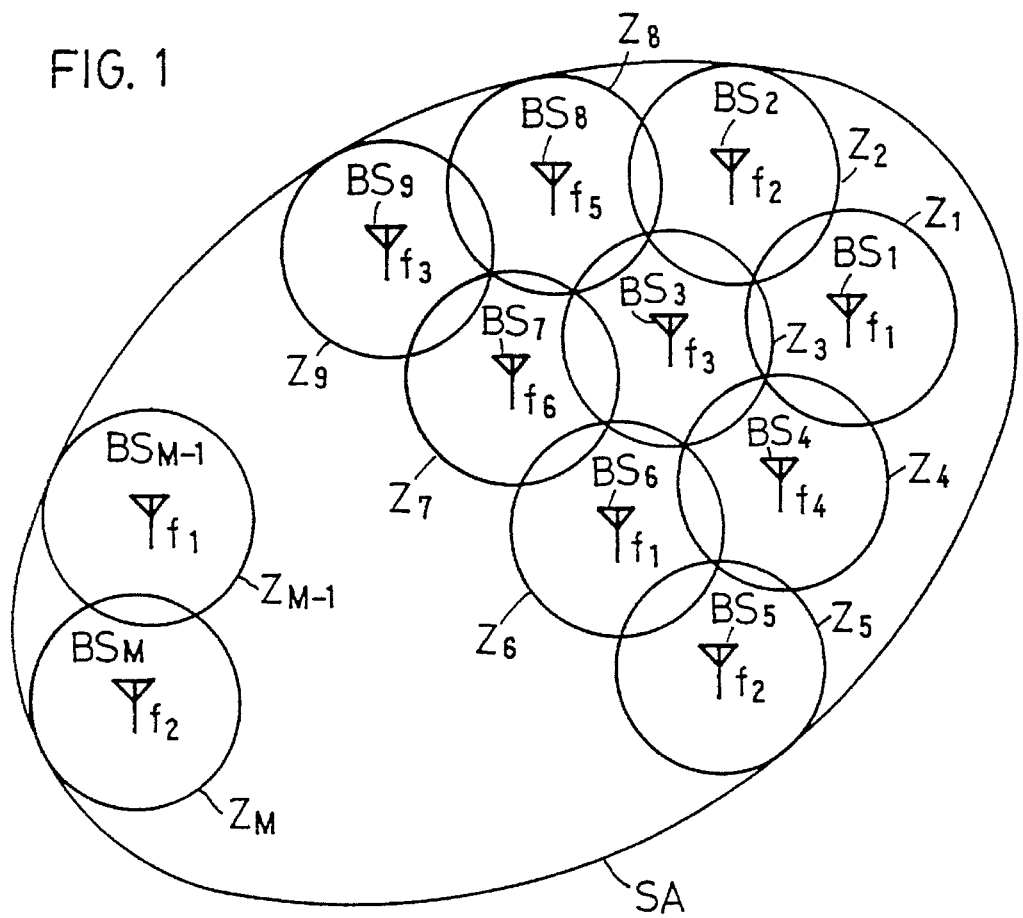
FIG. 1 is a diagram schematically showing the zoning and frequency allocation in the service area of a mobile radio communication system.
Figure 2:
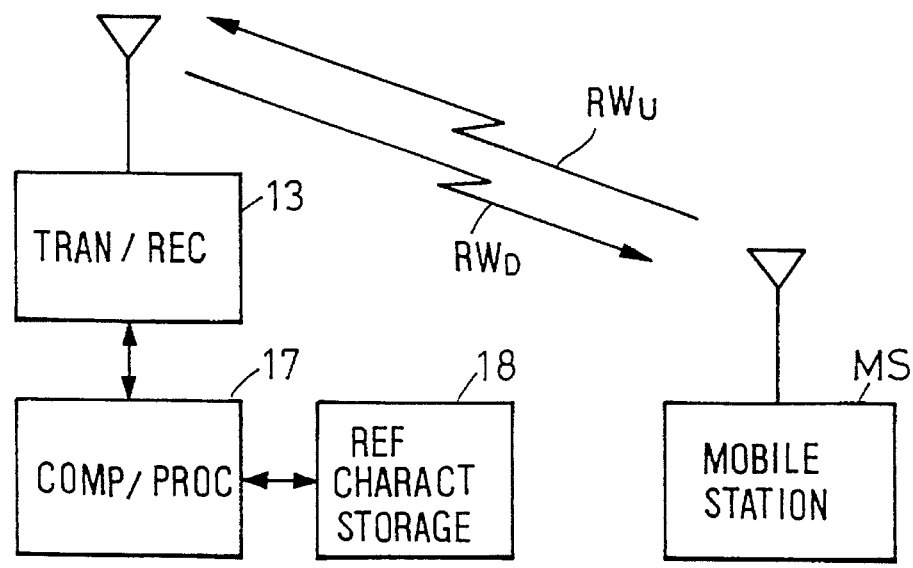
FIG. 2 is a block diagram illustrating an example of the zone configuration of a mobile radio communication system embodying the method of this invention.

In FIG. 2 there are illustrated an example of the configuration of the base station BS in one zone $Z_i$ of the mobile radio communication system of FIG. 1 and a mobile station MS when the present invention is applied thereto. The base station BS of the zone $Z_i$ has a radio transmitter/receiver 13, a comparison/processing part 17 and a reference characteristic storage part 18. The radio base station BS is capable of two-way communications with the mobile station MS in the zone $Z_i$ through the use of a downlink radio wave (radio wave directed to the mobile station) $RW_D$ and an uplink radio wave (radio wave directed to the radio base station) $RW_U$. The downlink radio wave $RW_D$ that is sent from the base station BS contains a downlink control channel and a downlink communication channel, whereas the uplink radio wave $RW_U$ that is sent from the mobile station contains an uplink control channel and an uplink communication channel different in frequency from those of the downlink radio wave $RW_D$.

The base station BS transmits from the radio transmitter/receiver 13 a control signal and a communication signal over the downlink control channel and the downlink communication channel, respectively. The control signal that is sent over the downlink control channel has a predetermined format containing, for example, a call control signal for call setup use, a base station identifying signal, a peripheral zone identifying signal and a synchronizing signal. As in the prior art, the mobile station MS is always in a call waiting state (i.e., in a standby state) and is continuously or intermittently receiving the downlink control channel. Upon receiving an incoming call thereto via the control channel, the mobile station MS sends a control signal via the uplink control channel to the base station BS to acknowledge the reception of the incoming call, then receives the downlink communication channel following an instruction sent over the downlink control channel from the base station BS, and sends a communication signal over the uplink communication channel.

According to the present invention, the field intensity (the receiving signal level) and signal quality (a bit error rate BERR, for instance) of the downlink control channel which the mobile station MS is receiving in each zone $Z_i$ are measured at desired time intervals and the measured results are sent to the base station BS over the uplink control channel. The base station BS acquires for a desired period of time data on the field intensity and the signal quality received from the mobile station, then statistically processes them and analyzes the state of interference in the channel used in that zone; when it is judged that the state of interference has become worse than a prescribed state, the channel frequency used in that zone is switched to a different frequency. To implement such a scheme, the radio base station BS is provided with the comparison/processing part 17 and the reference characteristic storage part 18.

Figure 3A:
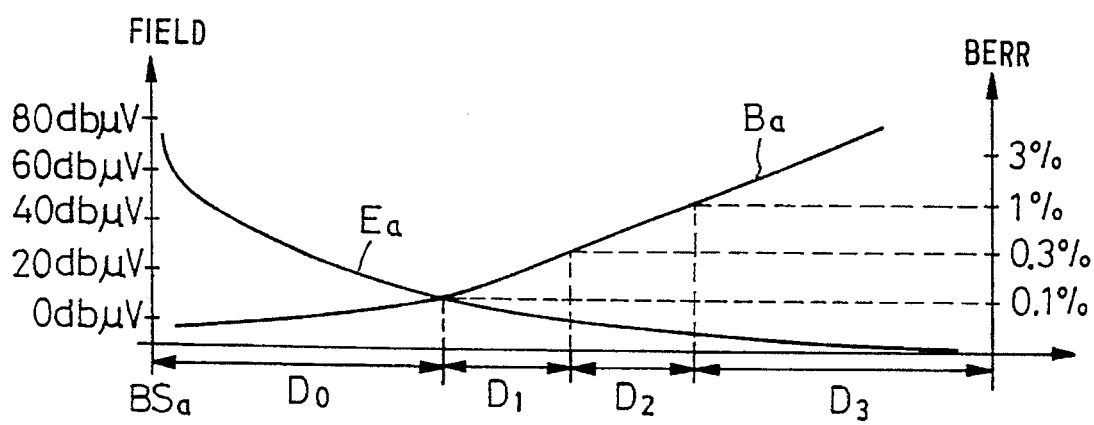
FIG. 3A is a graph showing theoretical curves of changes in the field intensity and the bit error rate with respect to the distance from a base station to a mobile station in the absence of interference waves.

Depicted in FIG. 3A are curves $E_a$ and $B_a$ showing the relationships of the field intensity and the bit error rate measured in the mobile station MS of a certain zone to the distance thereto from the base station $BS_a$ in the case where the zone has no interference from base stations of other zones (that is, in an ideal state), the abscissa representing the distance from the base station $BS_a$, the left-hand ordinate the field intensity and the right-hand ordinate the bit error rate BERR. In the absence of interference, the ideal curve $E_a$ of the field intensity and the ideal curve $B_a$ of the bit error rate with respect to the distance from the base station $BS_a$ can be calculated theoretically. As the distance from the base station $BS_a$ increases, the field intensity decreases and the bit error rate BERR increases little by little, and when the field intensity becomes smaller than a certain value (10 dBµV, for instance), the rate (gradient) at which the bit error rate BERR increases abruptly goes up. In accordance with the range of magnitude of the bit error rate BERR (for example, BERR<0.1%, $0.1 \leq$ BERR<0.3%, 0.3<BERR<1.0% and 1.0%<BERR), the distance from the base station $BS_a$ is divided into, for example, an error-free region $D_0$, a small-error region $D_1$, a medium-error region $D_2$ and a large-error region $D_3$. The region $D_0$ is one that permits communication without hindrance; the error in the region $D_1$ arises mainly from fading; the error in the region $D_2$ results primarily from fading and noise; and the error in the region $D_3$ is attributable principally to the degradation of the SN ratio of the receiving signal and this is a difficult-to-communicate region.

Figure 3B:
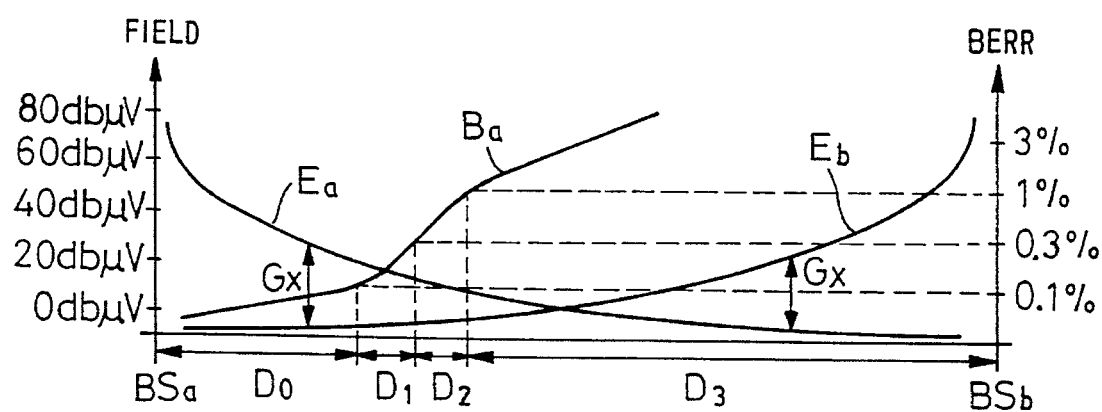
FIG. 3B is a graph showing changes in the bit error rate in the presence of interference waves in FIG. 3A.

In contrast to FIG. 3A, FIG. 3B shows examples of the field intensity and the bit error rate BERR measured with respect to the distance from the base station $BS_a$ in the case where a channel of the same frequency as that used in the base station $BS_a$ exists as an interference radio wave transmitted from a base station $BS_b$ of a zone distant from that of the base station $BS_a$. The curve $E_b$ shows the field intensity of the interference control channel from the base station $BS_b$. In the presence of such an interference channel, the field intensity of a desired receiving control channel drops with distance from the base station $BS_a$, as indicated by the curve $E_a$, and at the same time, the field intensity of the interference control channel received from the base station $BS_b$ increases as indicated by the curve $E_b$; hence, the bit error rate BERR begins to abruptly go up at a position nearer to the base station $BS_a$ than in the case of FIG. 3A, as indicated by the curve $B_a$ in FIG. 3B. As a result, the error-free region $D_0$, the small-error region $D_1$ and the medium-error region $D_2$ shift toward the base station $BS_a$, and become smaller, whereas the large-error region $D_3$ becomes larger relative the base station $BS_a$.

Figure 4:
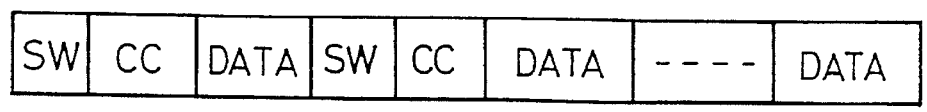
FIG. 4 is a diagram showing an example of the format of a control signal.

While in a call waiting state in the control channel of its visiting zone, the mobile station MS always monitors the reception levels of the call waiting control channel of the visiting zone and those of the control channels of peripheral zones at regular intervals so as to detect its migration into a new zone. According to the present invention, the mobile station MS measures the bit error rate BERR of the control signal received in the call waiting control channel and sends the measured value to the base station BS over the uplink control channel together with the reception level of the received control signal. For example, as shown in FIG. 4, the control signal has a predetermined format formed by iterations of a synchronizing word SW, a zone identifying code (referred to as color code) CC and control data DATA. The control data DATA differs with the type of the control signal, but the synchronizing word SW is predetermined in the system and the identifying code CC is predetermined for each zone. The bit error rate BERR can be measured by detecting a preknown specific signal or signals which are always contained in the control signal, such as any one of the synchronizing word SW, the zone identifying code CC and so forth, or a desired combination thereof. The measured reception level and bit error rate BERR can be sent to the base station BS by such methods as described below.

(a) A signaling format exclusively for reporting the measured results is used to send them to the base station over the uplink control channel on demand or voluntarily at regular time intervals.

(b) The measured results are sent, as part of a predetermined control signal for one of various uplink control channels now used in the existing communication systems, to the base station BS on demand or voluntarily at regular time intervals. The following schemes can be used to assemble the measured results into the control signal.

The measured results are assembled into a location registration signal that the mobile station MS transmits to the base station BS at regular time intervals.

During communication the measured results are assembled into a radio section control signal which is generated on a time-division basis at timing other than that of communication information. For example, in a personal digital cellular system, since a transmitting power control instruction is sent to the mobile station MS, the measured results are assembled into a signal that is used to report the field intensity of the downlink communication channel being measured by the mobile station MS.

The measured results are assembled into a call-connect control signal.

The method (a) involves the setting of a new signaling format, and hence inevitably causes an unwanted increase in traffic. In contrast to this, the method (b) sends the assembled measured results in the existing signal, with a negligibly small increase in traffic, and hence can easily be implemented.

As described above, an interference control channel of the same frequency as that of the desired control channel will increase the bit error rate of the received signal in a desired control channel and degrade the signal quality accordingly. The degree of degradation differs with the field intensity ratio between the two channels interfering with each other.

Figure 5:
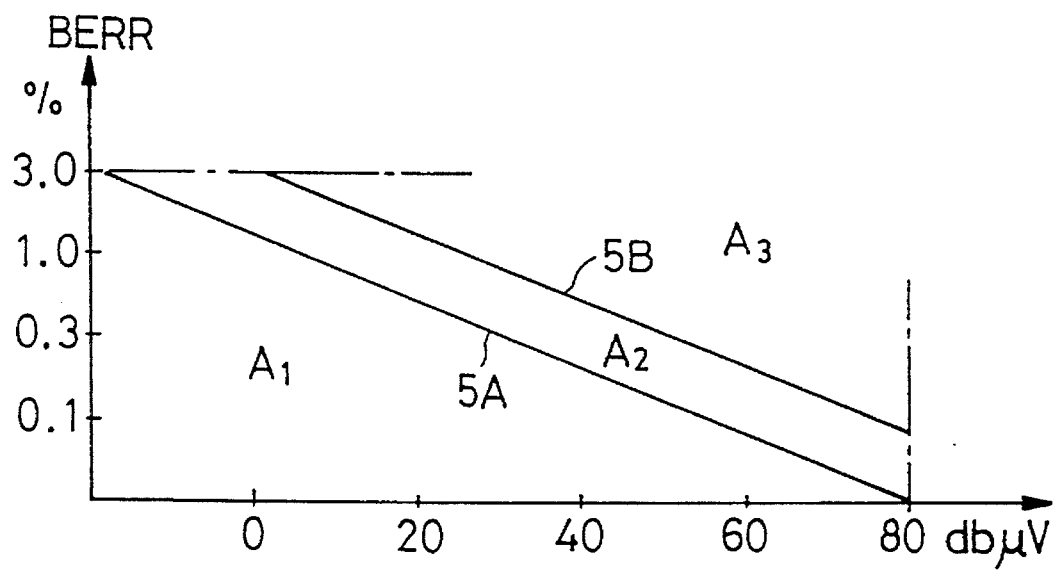
FIG. 5 is a graph showing an example of a reference characteristic stored in a reference characteristic storage part 18 in FIG. 2.

FIG. 5 is a reference characteristic diagram showing the relationship between the field intensity and the speech or signal quality (bit error rate BERR) that is used as a reference for the analysis of the state of interference. The reference characteristic is prestored in the reference characteristic storage part 18 in FIG. 2. In FIG. 5 the straight line 5A indicates a theoretical relationship between the field intensity and the bit error rate BERR obtained by calculations in the ideal state mentioned above with respect to FIG. 3A, and the straight line 5B indicates an allowable range of interference predetermined relative to the theoretical relationship 5A, taking into account the signal quality degradation under the influence of fading and interference of radio waves. That is, when the measured points ($E_{RL}$, BERR) defined by the field intensity (the reception level) $E_{RL}$ and the signal quality (BERR) measured by the mobile station MS are in an area $A_1$ under the straight line 5A in FIG. 5, it can be judged that the control channel of the mobile station is entirely free from the interference by control channels of other zones. When the measured points ($E_{RL}$, BERR) are in an area $A_2$ surrounded by the straight lines 5A and 5B, it can be judged that fading and the influence of interference are permissible. When the measured points ($E_{RL}$, BERR) are in an area $A_3$ above the straight line 5B, it can be judged that there exists an interference channel of a unpermissively high field intensity. Where the influence of the interference is below the allowed limit, ordinary points of measurement are mostly found in the area $A_2$ defined by the straight lines 5A and 5B and not many points of measurement are considered to exist in the area $A_1$, but the presence of such points of measurement in the area $A_1$ is not due to the influence of interference; hence, the areas $A_1$ and $A_2$ are regarded as a normal area in this example.

In the base station BS the reference characteristic depicted in FIG. 5 is prestored in the reference characteristic storage part 18, then the measured points ($E_{RL}$, BERR) received from individual mobile stations are compared with the reference characteristic of FIG. 5, and on the basis of the results obtained by statistically processing data on the results of comparison (results of judgment as to whether the measured value is abnormal or normal) made for a fixed period of time, a check is made to see if the influence on the channel of the zone by the interfering channels of other zones is within an allowable range (a range wherein the channel frequency need not be switched to another frequency). This can be implemented using such methods as described below.

(I) First Method

For example, the reference characteristic indicated by the straight line 5B in FIG. 5 is prestored in the reference characteristic storage part 18. Upon receiving the measured results ($E_{RL}$, BERR) from each mobile station MS, the base station BS checks in the comparison/processing part 17 whether the measured points ($E_{RL}$, BERR) fall in the area $A_3$ or $A_1+A_2$ in FIG. 5. If a measured point is in the area $A_3$, it is decided that interference is present (abnormal), and the measured point ($E_{RL}$, BERR) is counted as an abnormal point. If the measured point is in the area $A_{1+2}$, it is decided that no interference exists (normal). The comparison/processing part 17 counts the number of all points of measurement received for a fixed period of time (an hour, for instance) and the number of abnormal points detected, then calculates the ratio of the number of abnormal points to the number of all the points of measurement and, if the ratio is within a prescribed value, judges that the influence of interference is within the permissible limit. If the above-mentioned ratio is in excess of the prescribed value, then the comparison/processing part 17 judges that the influence of interference is not permissible, in which case the channel frequency used is switched to another frequency.

(II) Second Method

Figure 6:
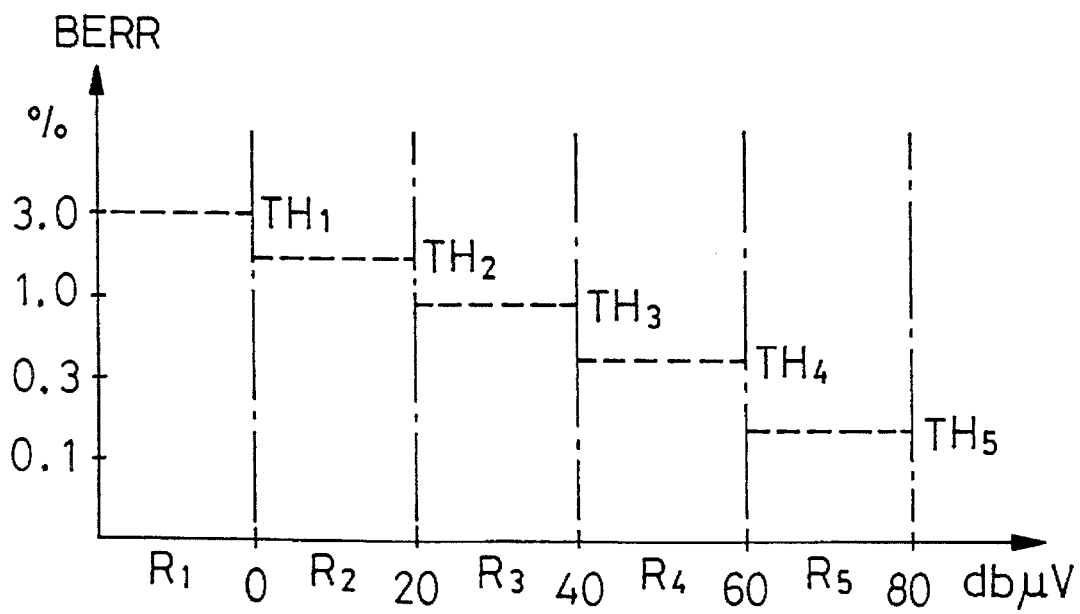
FIG. 6 is a graph for explaining an example of statistical processing of measured results.

The field intensity in FIG. 5 is divided into regions $R_1$, $R_2$, . . . , $R_5$ of a predetermined width (20 dbµV) as shown in FIG. 6 and error rate threshold values $TH_1$, $TH_2$, . . . , $TH_5$ are predetermined for such regions. Each threshold value is, for example, the mean value of the straight line 5B in FIG. 5 in each divided region. The comparison/processing part 17 determines the region $R_i$ (i=1, . . . , 5) to which the field intensity $E_{RL}$ of the measured point ($E_{RL}$, BERR) received from each mobile station MS is to belong, then compares the measured bit rate error (BERR) with the threshold value $TH_i$ of that region $R_i$ and judges whether the measured point is normal or abnormal, depending on whether the measured bit rate error (BERR) is smaller or larger than the threshold value $TH_i$. The comparison/processing part 17 calculates the ratio $C_i$ of the number of measured points judged as abnormal to the number $S_i$ of measured points counted in each of the regions $R_1$ to $R_5$ for a fixed period of time, then compares a mean value of such ratios $C_i$ (i=1, . . . , 5) or their sum with a predetermined reference value, and if the former is larger than the latter, judges that the influence of the interference channel is not permissible. To obtain the mean or sum total of the ratios $C_i$, values weighted by weighting factors $W_1$ to $W_5$ predetermined for the respective regions $R_1$ to $R_5$ may be summed like $\Sigma C_i W_i$ (i=1, . . . , 5).

In the method (II), instead of using the threshold values $TH_1$ to $TH_5$ for the regions $R_1$ to $R_5$, it is also possible to divide the reference straight line 5B by the regions $R_1$ to $R_5$ and make a check to see if each measured point belonging to each region $R_i$ is above or below the divided reference straight line of that region.

Figure 7A:
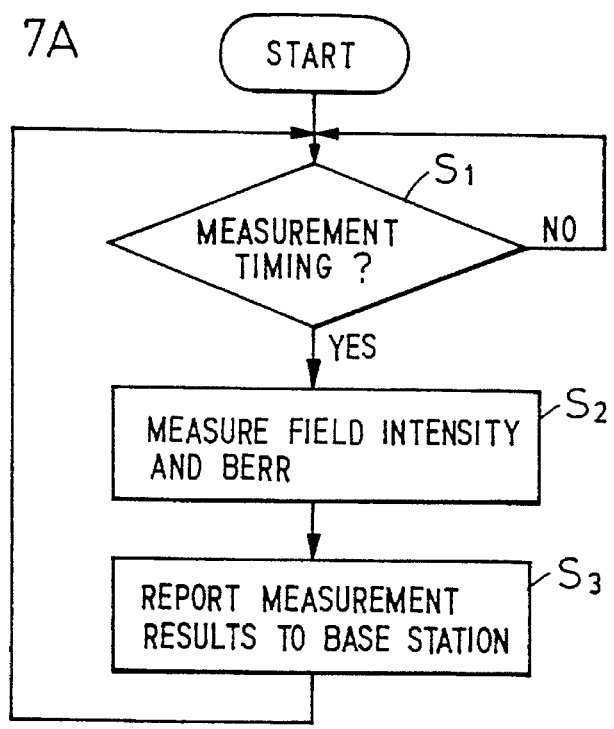
FIG. 7A is a flowchart illustrating an example of a procedure in a mobile station according to the method of this invention.

The measurement by the mobile station MS and the statistical processing by the base station BS described above may be summarized as follows:

As shown in FIG. 7A, the mobile station MS monitors if the timing for measurement has been reached ($S_1$). That is to say, the mobile station MS carries out measurement at regular time intervals, for example, upon each time-out of a preset timer. The measurement interval, that is, the timer setting time is one or five minutes, for instance; it is also possible to set a short time for a small zone and a relatively long time for a large zone. Various other schemes can be employed; for instance, the measurement can be made upon each reception of a location registration report request that is regularly sent from the radio base station BS to the mobile station MS as described previously.

When the timing for measurement is reached, the mobile station MS measures the field intensity of the downlink radio wave $RW_D$ from the radio base station BS, which is usually the radio wave of the control channel for receiving an incoming call, and its quality (the bit error rate, for instance) ($S_2$). Then, the mobile station MS reports the measured results to the radio base station BS with the uplink radio wave $RW_U$, that is, over the control channel for call origination request use ($S_3$). The measured results may also be reported together with a report replying to the aforementioned report request from the radio base station BS.

Figure 7B:
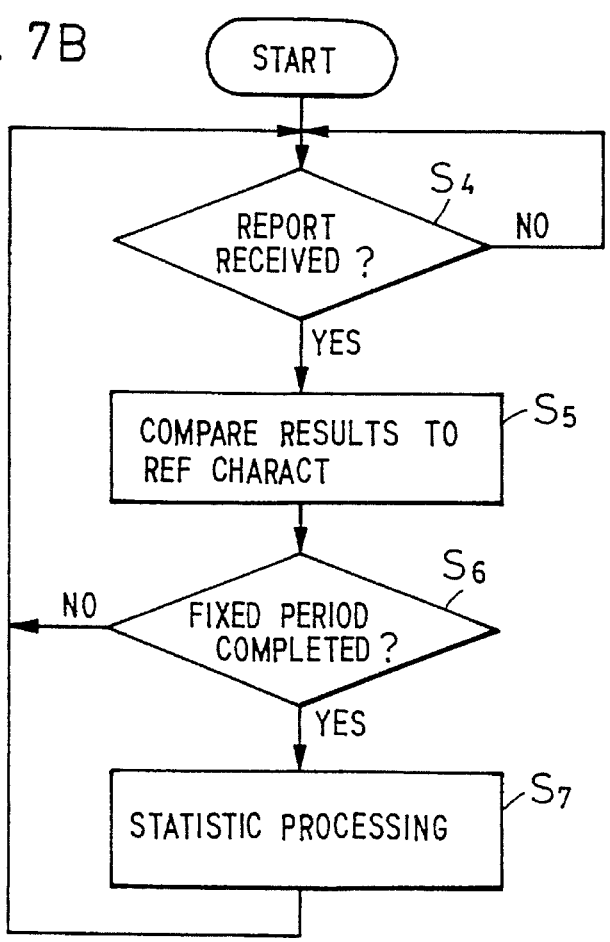
FIG. 7B is a flowchart illustrating an example of a procedure in a radio base station.

As shown in FIG. 7B, the radio base station BS waits for the report of measured results from each mobile station MS ($S_4$) and, upon each reception of the report, compares the measured results with the reference characteristic ($S_5$). That is to say, the base station BS compares the measured results with the reference characteristic prestored in the reference characteristic storage part 18 and makes a check to determine if the measured point indicated by the measured results is abnormal or not, thereafter counting the number of meaured points and the number of abnormal points. Next, the base station BS checks whether a fixed period of time, for example, an hour has passed ($S_6$), and if not, goes back to step $S_4$ to continue the reception of measured results. If it is judged in step $S_6$ that the fixed period of time has passed, the measured points acquired during the fixed period and the measured points decided as abnormal are statistically processed and a check is made to determine if the influence of the interference channel is within the allowed limit ($S_7$).

As described above, according to the present invention, the mobile station measures the field intensity and quality of the downlink radio wave and the radio base station processes the measured results; hence, even while the mobile radio communication system is in service, the state of interference can be evaluated, and when the state of interference varies due to a change in the radio wave environment, it is possible to detect the change in the state of interference following it in a short time. Thus, there is no need of management control via a centralized control device or artificial management.

In the mobile radio communication system that autonomously determines the frequencies of the radio waves (the channels) which the base stations radiate, the validity of the radiated radio wave is judged autonomously.

With a plurality of frequencies assigned to the base station, the channel frequency used can autonomously be switched to another one of the other assigned frequencies when the base station detects the occurrence of an abnormality; that is, an autonomous base station with no centralized control device can be used.

Since the mobile station carries out the measurement, an abnormality in the service area (home zone) of the base station is detected from the user's standpoint, and the base station changes the state of propagation of its downlink radio wave by controlling its transmission output or the direction of an antenna, and by learning the state of interference from the measured results sent from the mobile station, an optimum state can be obtained.

It will be apparent that many modifications and variations may be effected without departing from the scope of the novel concepts of the present invention.

What is claimed is:

1. A method for monitoring the state of interference in each zone of a mobile radio communication system wherein a mobile station in each zone performs communication via a base station of said each zone, said method comprising the steps of:

(a) periodically measuring, by said mobile station, the field intensity and quality of a downlink radio wave from said base station;

(b) reporting measured results from said mobile station to said base station;

(c) collecting, by said base station for a predetermined period of time, said measured results reported from said mobile station and statistically processing said collected measured results into data about the state of interference by comparing said measured results with a predetermined reference characteristic to judge whether said measured results are abnormal or not, said reference characteristic being a characteristic predetermined on the basis of a characteristic representing an ideal relationship between field intensity and bit error rate; and (d) evaluating said data about said state of interference, thereby judging the state of interference between the radio wave from said base station and other radio waves of the same frequency as that of said radio wave from said base station, it being judged whether said measured results are abnormal by comparing said measured results with said bit error rate defined by said reference characteristic, the ratio of the number of measured results judged as abnormal to the number of measured results collected for said predetermined period of time being used as an index indicating said state of interference.

2. The method of claim 1, wherein said downlink radio wave is a downlink control channel.

3. The method of claim 1, wherein said step (b) comprises a step of requesting said mobile station from said base station to send thereto said measured results, and a step of sending said measured results from said mobile station to said base station in response to said request.

4. The method of claim 1, wherein said step (b) comprises a step of voluntarily sending said measured results from said mobile station at regular time intervals.

5. A method for monitoring the state of interference in each zone of a mobile radio communication system wherein a mobile station in each zone performs communication via a base station of said each zone, said method comprising the steps of:

(a) periodically measuring, by said mobile station, the field intensity and quality of a downlink radio wave from said base station;

(b) reporting measured results from said mobile station to said base station;

(c) collecting, by said base station for a predetermined period of time, said measured results reported from said mobile station and statistically processing said collected measured results into data about the state of interference by comparing said measured results with a predetermined reference characteristic to judge whether said measured results are abnormal or not, said reference characteristic being defined by error rate threshold values determined on the basis of an ideal characteristic indicating an ideal relationship between field intensity and bit error rate in respective intensity regions obtained by dividing field intensity; and (d) evaluating said data about said state of interference, thereby judging the state of interference between the radio wave from said base station and other radio waves of the same frequency as that of said radio wave from said base station, by deciding the intensity region to which said measured results belong, comparing said measured results with said threshold value of said intensity region to determine whether said measured results are abnormal or not, calculating the ratio of the number of measured results determined to be abnormal to the number of measured results belonging to each of said intensity regions during said predetermined period of time, weighting said ratios with predetermined weighting factors, respectively, and summing said weighted ratios to obtain an index indicating said state of interference.

* * * * *